US007481052B2

(12) United States Patent
Mauch et al.

(10) Patent No.: US 7,481,052 B2
(45) Date of Patent: Jan. 27, 2009

(54) FLUID CIRCUIT WITH MULTIPLE FLOWS FROM A SERIES VALVE

(75) Inventors: Adam R. Mauch, Mooreton, ND (US); William C. Shelbourn, Bismarck, ND (US); Joseph A. St. Aubin, Wahpeton, ND (US); Knute K. Brock, Bismarck, ND (US); Wally L. Kaczmarski, Lisbon, ND (US)

(73) Assignee: Clark Equipment Company, Montvale, NJ (US)

( * ) Notice: Subject to any disclaimer, the term of this patent is extended or adjusted under 35 U.S.C. 154(b) by 301 days.

(21) Appl. No.: 11/405,375

(22) Filed: Apr. 17, 2006

(65) Prior Publication Data

US 2007/0240413 A1 Oct. 18, 2007

(51) Int. Cl.
*F16D 31/02* (2006.01)
*F15B 13/04* (2006.01)

(52) U.S. Cl. .......... 60/422; 91/444

(58) Field of Classification Search .......... 60/420, 60/422, 484; 91/444
See application file for complete search history.

(56) References Cited

U.S. PATENT DOCUMENTS

| | | | | |
|---|---|---|---|---|
| 3,635,365 | A | 1/1972 | Bauer | |
| 3,916,624 | A | 11/1975 | Machens et al. | 60/394 |
| 4,408,518 | A | 10/1983 | Diel et al. | 91/31 |
| 4,526,085 | A | 7/1985 | Morizur et al. | 91/6 |
| 4,844,685 | A | 7/1989 | Sagaser | 414/700 |
| 5,083,428 | A | 1/1992 | Kubomoto et al. | |
| 5,957,213 | A | 9/1999 | Loraas et al. | 172/2 |
| 6,018,895 | A | 2/2000 | Duppong et al. | 37/348 |
| 6,029,446 | A | 2/2000 | Duppong et al. | 60/424 |
| 6,062,331 | A | 5/2000 | Grunow et al. | 180/268 |
| 6,502,499 | B2 * | 1/2003 | Sannomiya et al. | 91/444 |
| 2006/0021338 | A1 * | 2/2006 | Sprinkle et al. | 60/420 |

FOREIGN PATENT DOCUMENTS

| | | |
|---|---|---|
| EP | 0816577 | 1/1998 |
| EP | 1598561 | 11/2005 |
| JP | 60164522 | 8/1985 |
| JP | 07127103 | 11/1993 |
| JP | 09003976 | 1/1997 |

OTHER PUBLICATIONS

PCT/US2007/063368 International Search Report dated Aug. 7, 2007.

* cited by examiner

*Primary Examiner*—Michael Leslie
(74) *Attorney, Agent, or Firm*—Westman, Champlin & Kelly, P.A.

(57) ABSTRACT

A circuit or system having application for operating an implement or attachment for a power machine is disclosed. The circuit includes a first or primary valve, a second or auxiliary valve connected in series with the first valve and a supplemental line connected in parallel with the second valve to provide fluid to a supplemental system in parallel with the second valve.

20 Claims, 4 Drawing Sheets

FLUID CIRCUIT WITH MULTIPLE FLOWS FROM A SERIES VALVE

BACKGROUND OF THE INVENTION

The present invention relates to a fluid or hydraulic circuit. Fluid or hydraulic circuits are employed to activate or control functions of a power machine. Hydraulic fluid is supplied by a pump to power various machine functions, such as lift, tilt or powered attachment. Fluid flow to various machine functions is controlled by valves or a valve stack. Different functions can have different application or system parameters, such as different flow parameters, making it difficult to energize or operate different functions using a single pump or a multi-function valve stack. The present invention addresses these and other problems and provides advantages not previously recognized nor appreciated.

SUMMARY

The present invention relates to a fluid or hydraulic circuit having application for a power machine. As shown, the circuit includes a first valve, a second valve connected in series with the first valve and a supplemental line connected in parallel with the second valve to provide fluid to a supplemental circuit in parallel with the second valve.

In one embodiment described, fluid is supplied from a pump to the first or primary valve to power primary machine functions. Fluid is supplied to an auxiliary valve in series with the primary valve to power auxiliary functions or a powered attachment. A supplemental line is connected in parallel with the auxiliary valve to provide an additional flow path to a supplemental or charging circuit.

Other features and benefits that characterize embodiments of the present invention will be apparent upon reading the following detailed description and review of the associated drawings.

DETAILED DESCRIPTION OF THE PREFERRED EMBODIMENTS

Figure 1:
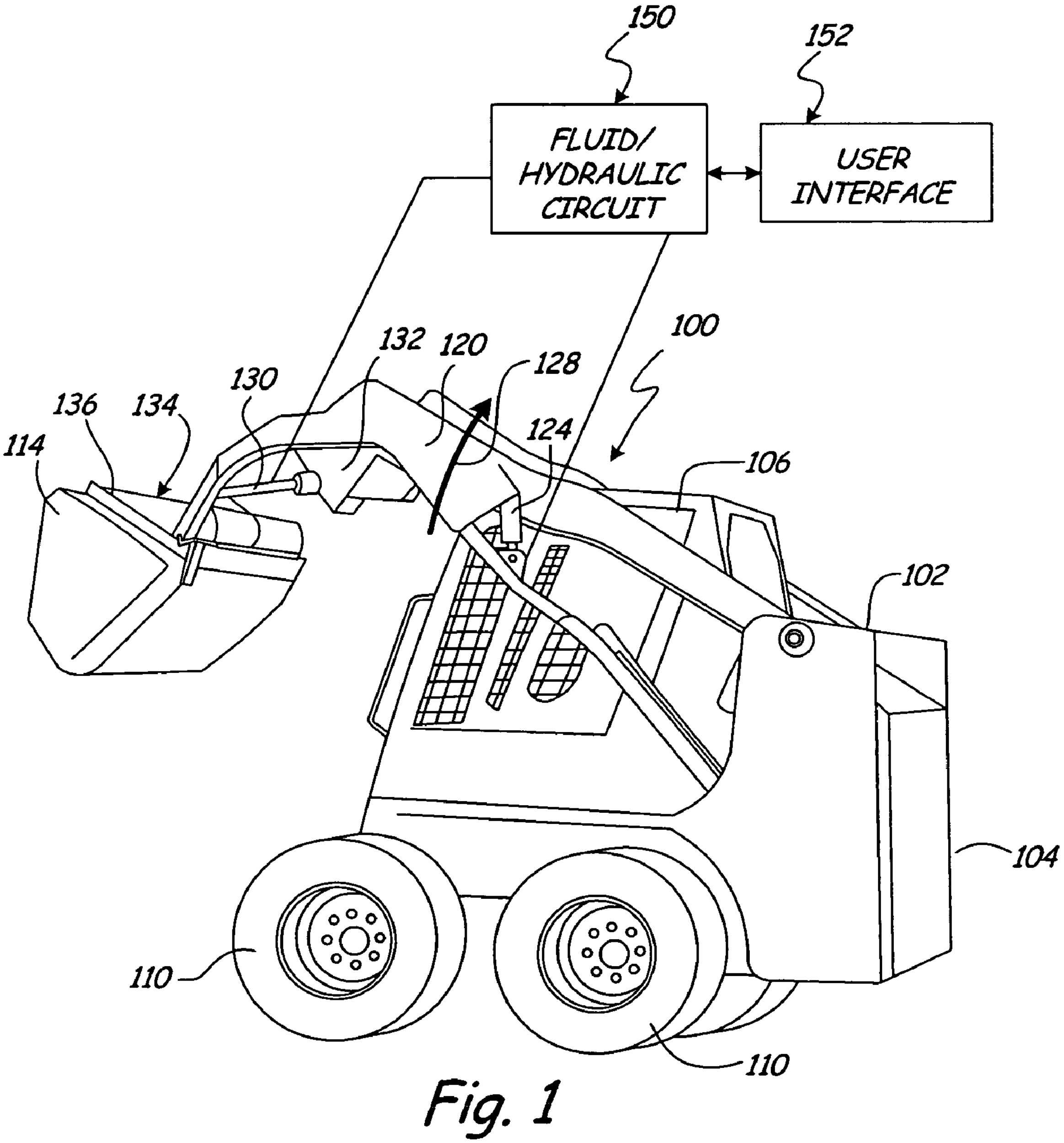
FIG. 1 illustrates an embodiment of a power machine or loader.
Figure 2:
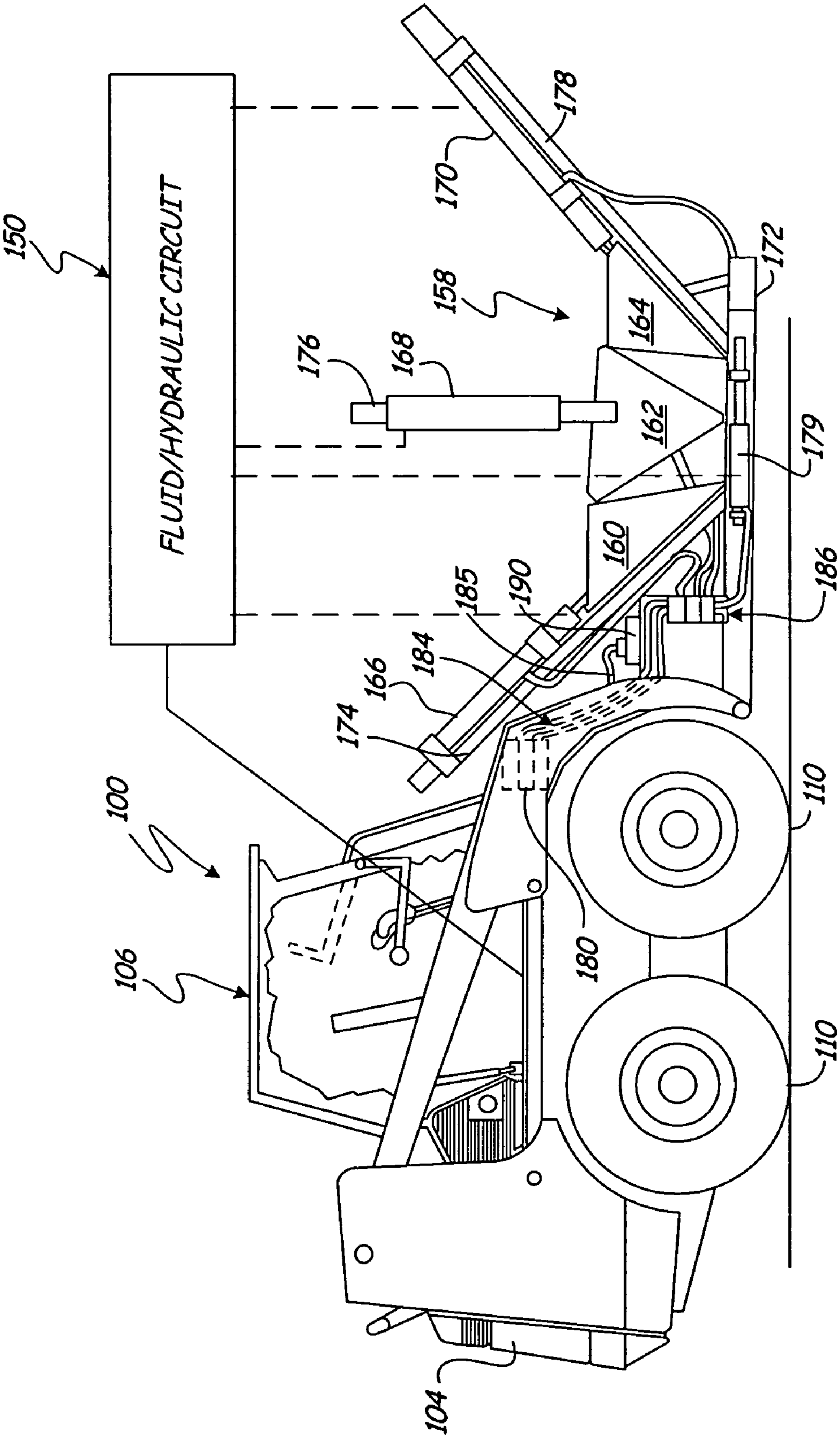
FIG. 2 illustrates an embodiment of a power machine having a powered attachment or spade.

The present invention relates to a fluid or hydraulic circuit to operate functions or an attachment of a power machine or vehicle of the types illustrated in FIGS. 1 and 2. Application, however of the present invention is not limited to the particular vehicles shown in FIGS. 1 and 2.

In the embodiment illustrated in FIG. 1, the power machine 100 includes a body 102, an engine compartment 104, and an operator cab 106. The body 102 of the vehicle is supported relative to a frame (not shown). Wheels 110 are coupled to the frame so that the power machine 100 or vehicle can move over the ground during use. Application, however, of the present invention is not limited to a wheeled vehicle or loader as shown. For example, the present invention has application for a power machine which moves along a track instead of wheels.

In the embodiment illustrated in FIG. 1, the machine includes a bucket 114 coupled to lift arms 120 (only one shown in FIG. 1). Lift arms 120 are pivotally coupled to the body 102 of the machine to raise and lower the bucket 114. Fluid cylinders or actuators 124 (only one shown in FIG. 1) are coupled to the body 102 and lift arms 120 to raise and lower the lift arms 120 as illustrated by arrow 128.

The bucket 114 is rotationally coupled to the lift arms 120 so that an orientation of the bucket 114 can be adjusted relative to the lift arms 120. Bucket 114 is rotationally adjusted or tilted via a tilt cylinder 130 or cylinders. The tilt cylinder 130 is coupled to the lift arms 120 via attachment 132 and is coupled to the bucket 114 through an attachment interface 134 and bucket interface 136. The tilt cylinder 130 is extended and retracted to adjust the orientation or tilt of the bucket 114.

In the illustrated embodiment attachment interface 134 is rotationally coupled to the lift arms 120. Bucket interface 136 and cylinder 130 are coupled to attachment interface 134 to adjust the orientation of the bucket interface 136 relative to the lift arms 120 to thereby adjust tilt of the bucket 114.

The lift and tilt cylinders 124, 130 of the power machine described are powered by a fluid circuit or system 150, (e.g. hydraulic circuit) illustrated diagrammatically, through a user interface 152. The user interface 152 activates fluid circuit 150, for example using hand levers, foot pedals or electronically through electronic spools.

Different attachments or tools can be connected to lift arms to interchange different tools or implements. For example, a spade implement 158 of FIG. 2 can be connected to the power machine or vehicle instead of the bucket 114 depending upon the particular use or application desired. The spade implement 158 includes a plurality of spades 160, 162, 164. Spades 160, 162, 164 are coupled to hydraulic or fluid cylinders 166, 168, 170, respectively. The cylinders 166, 168, 170 and spades 160, 162, 164 are connected to a lower bracket 172 by a plurality of support brackets 174, 176, 178. Spades 160, 162, 164 are connected to move generally upwardly and downwardly along, and relative to the support brackets 174, 176, 178 to operate the spade implement 158. The implement also includes a gate cylinder 179 to open the bracket 172.

Cylinders 166, 168, 170 of the attached implement or tool are powered by the fluid circuit or system 150 of the machine through an auxiliary connection or interface 180. The auxiliary connection 180 includes fluid line connectors 184 and an electrical harness connector 185 to provide a fluid and an electrical interface to an auxiliary circuit.

The fluid line connectors 184 are connected by suitable conduits to an auxiliary valve or valve stack which in the illustrated embodiment includes a plurality of electrically controllable valves 186 to operate the spade implement 158. Valve or valves 186 provide fluid to the cylinders 166, 168, 170 to operate the powered attachment or spade. Valves 186 are controlled through the electrical interface with an auxiliary controller 190.

Figure 3:
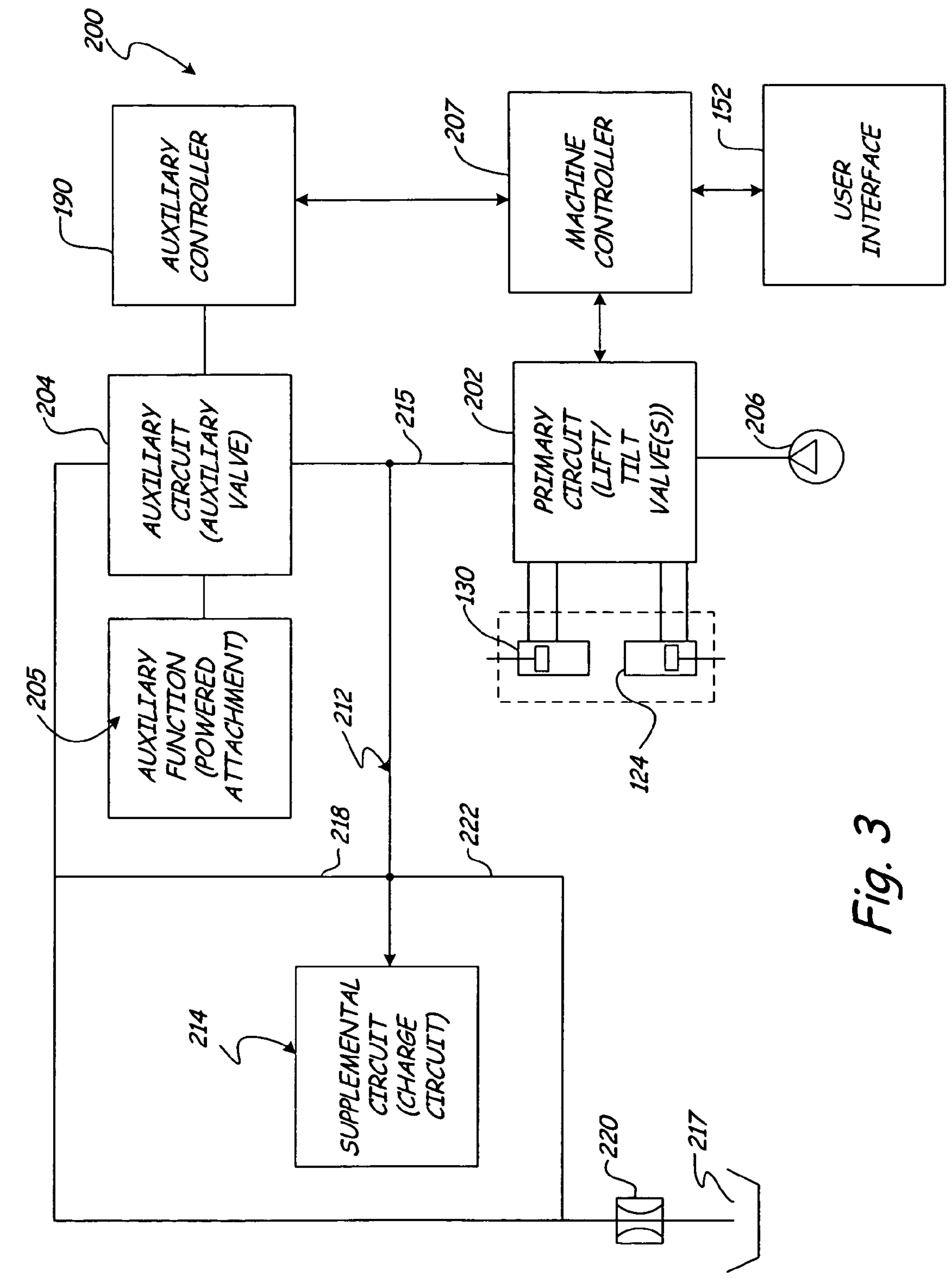
FIGS. 3-4 illustrate embodiments of a circuit configured to energize multiple machine functions.

FIG. 3 is a block diagram of an embodiment of a fluid circuit 200 to operate hydraulic functions of a power machine and/or implement. In the embodiment shown, the circuit 200 includes a first or primary circuit 202 and a secondary or auxiliary circuit 204. In the illustrated embodiment, the primary circuit supplies hydraulic fluid to operate the lift cylinder or cylinders for lift arm(s) and/or tilt cylinder or cylinders. The auxiliary circuit 204 provides hydraulic fluid to auxiliary functions 205 or powered attachment, such as, but not limited to the spade implement 158 of FIG. 2.

In the illustrated embodiment, the primary circuit 202 supplies fluid from pump 206 to cylinders 124, 130 to operate to a primary function or functions of a power machine. Fluid is supplied to cylinders 124, 130 based input from the user interface 152 through operation of machine controller 207. Fluid from pump 206 is also supplied to the secondary or auxiliary circuit 204 in series with the primary circuit 202.

The circuit 200 also includes a supplemental line 212 connected in parallel with the auxiliary circuit 204 to supply fluid to a supplemental function or charging circuit 214. The supplemental charging circuit 214 is thus powered using fluid from pump 206 which also supplies fluid to the primary and auxiliary functions 202, 204.

As shown, hydraulic fluid is pumped from pump 206 to fluid line 215 of the hydraulic circuit to drive cylinders 124, 130. Flow is provided to auxiliary circuit 204 or valve to power auxiliary function 205 via auxiliary controller 190 through an interface with the machine controller 207. The supplemental line 212 is connected to the fluid line in parallel with the auxiliary circuit 204 downstream of the primary circuit 202 to provide multiple flows to power the auxiliary function or functions 205 and supplemental line 212 concurrently.

Additionally, the illustrated embodiment includes a supplemental feed line 218 to provide fluid flow to the supplemental circuit 214 downstream of the primary and auxiliary circuits 202, 204, and upstream of a flow restrictor 220 as shown. Flow restrictor 220 restricts fluid flow to tank to maintain line or operating pressure to the supplemental charge circuit 214. Excess fluid from supplemental lines 212 and 218 is discharged to tank as illustrated by line 222.

The system as described can accommodate different flow rates for the primary circuit 202 and the secondary or auxiliary circuit 204. For example, the system can support a 25 gpm flow rate for the primary circuit 202 (e.g. for lift and tilt functions) to enhance cycle or response time and provide a lower flow rate e.g. 20 gpm (gallons-per-minute) for an auxiliary or hydraulic powered attachment. As shown, the differential flow is used to power the supplemental or charge circuit 214. In the illustrated embodiment the system includes a single pump 206—although in alternate embodiments, additional pumps can be added or used before and after the auxiliary valve or circuit 204 for different operating functions.

Figure 4:
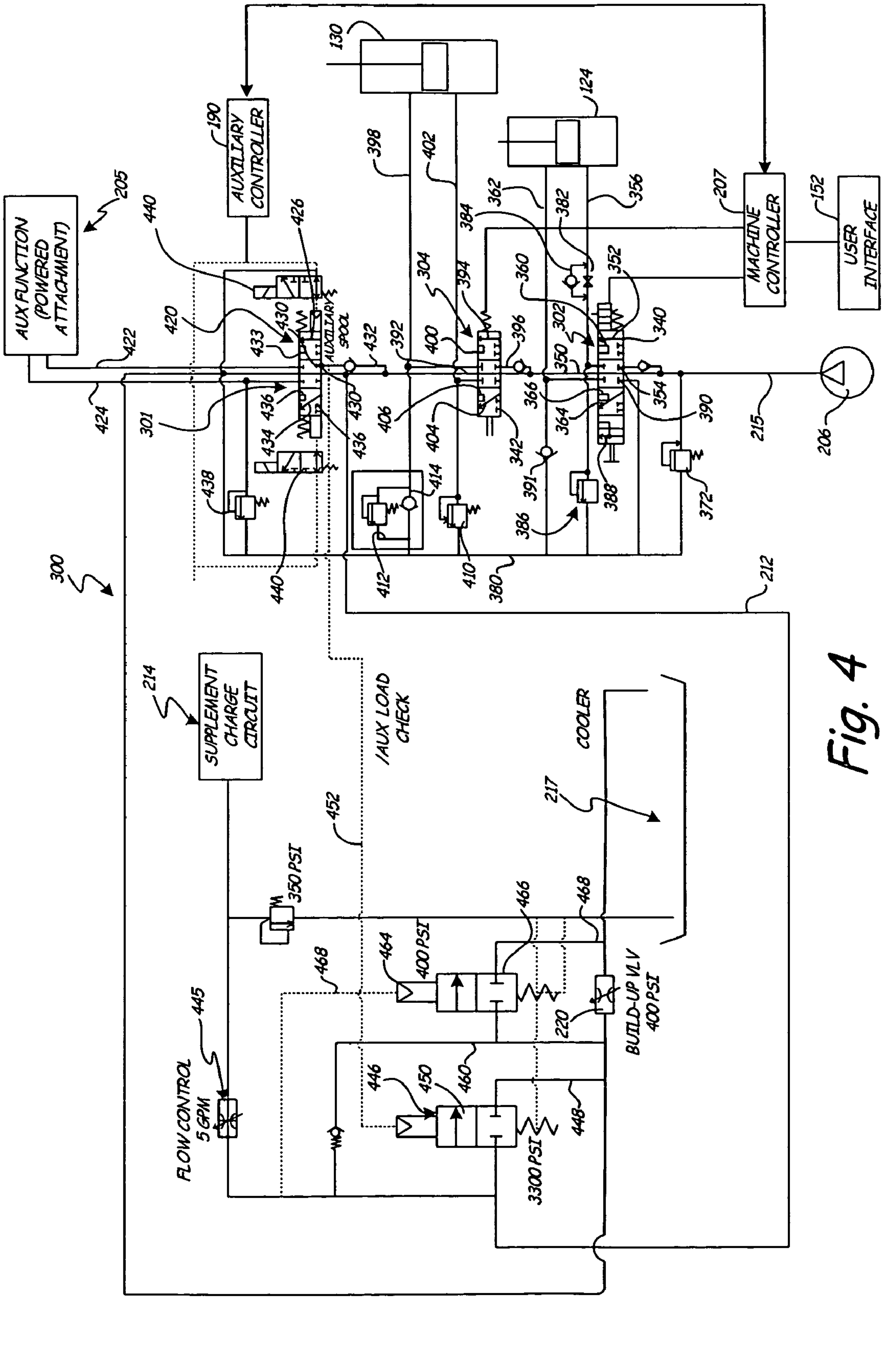

FIG. 4 illustrates another embodiment of a fluid circuit 300 which includes multiple flows for a series valve as previously described. The multiple flows can be used for different applications such as providing multiple flow to an auxiliary valve 301 and supplemental line 212 in series with a primary valve or valves. For example, in the illustrated embodiment the primary valves include valves 302, 304 which supply fluid to the lift cylinders 124 and tilt cylinder 130, respectively. Valves 302, 304 are connected in series so that output flow from one valve is directed to the other valve to drive the lift and tilt cylinders 124, 130 in series.

Lift and tilt valves 302, 304 include multi-directional valve spools 340, 342 operated via machine controller 207 based upon control input at user interface 152 as schematically illustrated. The machine controller 207 moves the valve spools 340, 342 relative to multiple valve positions to supply fluid to opposed cylinder chambers for lift or tilt functions which power primary functions of the machine.

Valve spool 340 as shown in FIG. 4 is in a neutral position. In the neutral position, fluid flows through bypass channel 350 to bypass lift cylinders 124. In a first energized position, the valve spool 340 is shifted from the neutral position so that channel 352 aligns with inlet port 354 to supply fluid from fluid line 215 to actuator line 356 to supply fluid to a first chamber for operating cylinder or cylinders 124 in a first direction. Fluid is released from an opposed chamber of the cylinder or cylinders 124 to fluid line 215 via connection of valve channel 360 relative to actuator line 362 coupled to the opposed cylinder chamber.

In a second alternate spool 340 position, valve channel 364 is aligned with inlet port 354 to supply fluid to actuator line 362 to actuate the cylinders 124 in an opposed direction from the first spool position. Fluid is released from cylinder through connection of actuator line 356 to valve channel 366. Fluid from channels 360, 366 flows to fluid line 215 to supply fluid to valve spool 342 in series with valve spool 340.

A pressure valve 372 is upstream of the valve spool 340 to divert fluid flow to relief line 380. The pressure valve 372 opens in response to high pressure or stall event to divert fluid flow. Actuator line 356 includes flow restrictor 382 to control or restrict flow to/from the first chamber and a check valve 384. Also as shown, actuator line 356 includes a pressure relief valve 386 between actuator line 356 and relief line 380 to release fluid or pressure.

Valve spool 340 also includes a float position. In the float position, a float channel 388 is aligned with actuator lines 356, 362 to provide fluid flow therebetween. Float channel 388 also includes a portion which is opened to an outlet port 390 coupled to relief line 380 to control pressure in the circuit. As shown, actuator line 362 is coupled to relief line 380 through check valve 391. Check valve 391 restricts flow to relief line 380 but allows flow from relief line 380 to the valve spool 342 and fluid line 356 (e.g. via channel 360).

As previously described, valve spool 342 is connected in series with valve spool 340. In the illustrated embodiment, valve spool 342 forms a tilt valve spool. In a neutral position, fluid flows through bypass channel 392 of the valve spool 342 to bypass the tilt cylinders 130. In a first active valve position, channel 394 is aligned with inlet port 396 to supply fluid flow to actuator line 398 to actuate cylinders 130. Fluid is released from an opposed chamber of cylinders 130 through channel 400 aligned with actuator line 402.

In a second valve position, channel 404 is aligned with inlet port 396 to supply fluid flow to an opposed cylinder chamber and fluid is released via alignment of spool channel 406 with actuator line 398. Actuator lines 398, 402 of the tilt valve are connected to relief line 380 via pressure relief valve assemblies 410, 412. The circuit includes check valve 414 to divert flow from relief line 380 to fluid line 398 through valve spool 304. Thus in the embodiment described, valve spools 340, 342 form the primary circuit 202, although application is not limited to the specific embodiment shown. For example, the lift valve can alternatively be connected in series with the tilt valve.

As previously described, auxiliary valve 301 is connected to the fluid line 215 in series with valves 302, 304. Although in the embodiment shown, the auxiliary circuit includes one valve, application is not limited to one valve as shown and multiple valves or valve stack could be included to operate a power attachment such as the spade implement 158 illustrated in FIG. 2.

Valve spool 420 is operable between a neutral position as shown in FIG. 4 and multiple operating positions to supply fluid to auxiliary lines 422, 424. In a first operating position, channel 426 is aligned with inlet port 430 to supply fluid to auxiliary line 422 through an inlet line 432. Fluid is released from auxiliary line 424 through valve channel 433. In a second operating position, channel 434 is aligned with inlet port 430 to supply fluid to auxiliary line 424.

Fluid is released from auxiliary line 422 through channel 436 to line 215. Auxiliary pressure is controlled via pressure relief valve assembly 372 or 438. The position of auxiliary valve spool 420 is controlled via pilot activated cartridges 440 which are operated by the auxiliary controller 190 to operate a power attachment or other auxiliary function as previously described.

The circuit 300 as described includes supplemental line 212 in parallel with valve spool 420 downstream of valve spools 340, 342 to provide parallel flow as described. In the illustrated embodiment, fluid flow through supplemental line 212 is restricted by flow gate or restrictor 445. As shown the circuit includes a pilot valve assembly 446, which is energizable to dump fluid to tank 217 via a drain line 448 based upon fluid pressure of the auxiliary circuit or system.

As shown, the pilot valve assembly 446 includes a pilot valve 450 operable via a pilot line 452 connected to inlet line 432 to the auxiliary valve spool 420. The valve assembly 446 operates between a closed position shown and an opened position (not shown in FIG. 4) responsive to pressure in the inlet line 432. Flow pressure feedback is provided via the pilot line 452 to operate the pilot valve 450. In the event there is undesired pressure buildup, the valve assembly 446 (pilot valve 450) is opened (not shown in FIG. 4) to dump excess fluid to tank via the drain line 448.

Valve 450 is shifted to the opened position above a threshold pressure so that the primary systems can operate in the event the auxiliary system stalls. Valve 450 is biased in the closed position and is opened to provide pressure relief in a stall event to allow other circuit components to operate upstream of the auxiliary circuit or valve 301. As shown in FIG. 4, and as described with respect to FIG. 3, restrictor 220 restricts fluid flow to tank 217 to maintain operational pressure to the supplemental charge circuit 214.

In the illustrated embodiment, the relief line 380 is connected to the fluid line 215 downstream of the valves 301, 302, 304. As shown, supplemental feed line 460 is disposed downstream of valves 301, 302, 304 and relief line 380 to provide flow to the supplemental or charge circuit 214 in the event of a stall to provide continuous charge flow. Line 460 is upstream of flow restrictor 220 and fluid flow through line 460 is controlled via pilot valve assembly 464. The pilot valve assembly 464 includes valve 466 which is operated via pilot line 468 coupled to line 212 to shift the valve 466 from a closed position to an opened position (not shown in FIG. 4) to divert fluid flow from line 460 to tank 217 through drain line 468. As shown, drain line 468 provides a flow passage around flow restrictor 220 to tank 217.

Thus as described, a supplemental line 212 is connected in parallel with a second valve, such as an auxiliary valve connected in series with a first valve. In illustrated embodiments, the first valve is a primary valve and the second valve is an auxiliary valve.

As described with reference to FIGS. 3-4, supplemental line 212 is connected in parallel with the auxiliary circuit to provide multiple flow paths for fluid to power multiple system functions. The additional or supplemental lines as disclosed accommodate different flow rates between the primary circuit and the auxiliary circuit or different circuit functions. Downstream flow is also diverted to the supplemental circuit to provide continuous fluid supply or charge support during different operating phases (e.g. while the auxiliary circuit is idled). In the embodiment shown, lift, tilt and auxiliary functions are supplied with fluid from a single pump for system efficiency. Diverted flow to the supplemental or charge circuit eliminates use of a dedicated gear pump for supplying fluid to the charge circuit.

Although application of the present invention is illustrated with respect to a loader, application is not limited to the particular embodiments shown, and the present invention can be used for other power machines such as excavators having attachments or implements controlled via operation of a fluid or hydraulic circuit. Further, application is not limited to a power machine having a particular design or function. Although the present invention has been described with reference to preferred embodiments, workers skilled in the art will recognize that changes may be made in form and detail without departing from the spirit and scope of the invention.

What is claimed is:

1. A circuit comprising:

a first valve coupled to a fluid line;

a second valve coupled to the fluid line; and a supplemental line coupled to the fluid line downstream of the first valve and upstream of the second valve and the second valve coupled to the fluid line in series with the first valve and in parallel with the supplemental line to provide fluid flow to a supplemental circuit in parallel with the second valve and the fluid line downstream of the second valve being coupled to the supplemental line or circuit in parallel with a drain line or tank to provide fluid flow to the supplemental circuit downstream of the second valve.

2. The circuit of claim 1 wherein the supplemental circuit is a charging circuit.

3. The circuit of claim 1 wherein the first valve supplies fluid to a primary function of a power machine and the second valve is an auxiliary valve to supply fluid to an auxiliary function or powered attachment.

4. The circuit of claim 3 wherein the auxiliary valve is operated via an auxiliary controller through an interface to a system controller.

5. The circuit of claim 3 wherein the first valve is a lift valve to provide fluid to at least one lift cylinder and including a tilt valve connected in series with the lift valve upstream of the second valve to provide fluid to at least one tilt cylinder.

6. The circuit of claim 1 wherein the first valve supplies fluid to a first function having a first flow rate and the second valve supplies fluid to a second or auxiliary function having a second flow rate lower than the first flow rate and the supplemental line receives a differential flow relative to the first flow rate and the second flow rate.

7. The circuit of claim 1 wherein the second va1ve controls an auxiliary circuit and comprising a control circuit including a pilot line to provide feedback with respect to flow pressure in the auxiliary circuit to control a pilot valve between the supplemental line and the fluid line or tank.

8. The circuit of claim 1 and including a control circuit including a pilot line coupled to a pilot valve to release fluid pressure from the supplemental line to the drain line or tank.

9. The circuit of claim 1 wherein the first valve is operable between a neutral position and at least one energized position and the second valve receives fluid flow from the first valve in the at least one energized position.

10. The circuit of claim 9 wherein in the at least one energized position of the first valve, fluid is supplied to a hydraulic device via a first valve channel and fluid is discharged from the hydraulic device to the fluid line via a second "U" shaped valve channel.

11. The circuit of claim 1 and further comprising a flow restrictor downstream of the second valve and the supplemental line or circuit and upstream of the drain line or tank.

12. The circuit of claim 11 and comprising a release valve coupled to the supplemental line upstream of the flow restrictor and to the drain line or tank downstream of the flow restrictor.

13. The circuit of claim 1 and comprising a pilot line operable to control a pilot valve between the supplemental line and the drain line or tank.

14. A power machine comprising:
a body;
at least one lift arm rotationally coupled to the body;
at least one cylinder coupled to the body and the lift arm;
a primary circuit coupled to a fluid line to supply fluid to the at least one cylinder and the primary circuit including at least one primary valve operable to supply fluid to the at least one cylinder;
an auxiliary circuit including at least one auxiliary valve; and
a supplemental line coupled to the fluid line downstream of the primary valve in parallel with the auxiliary valve to supply fluid to a supplemental circuit in parallel with the auxiliary valve and the fluid line downstream of the auxiliary valve is coupled to the supplemental line or circuit to supply fluid flow to the supplemental circuit downstream of the auxiliary valve.

15. The power machine of claim 14 and further comprising a powered attachment or implement coupled to the power machine and the auxiliary circuit or valve supplies fluid to the powered attachment or implement.

16. The power machine of claim 14 wherein the primary circuit includes at least one lift valve and at least one tilt valve connected in series to supply fluid to the at least one lift cylinder and supply fluid discharged from the at least one lift cylinder to at least one tilt cylinder.

17. The power machine of claim 14 wherein the supplemental line provides fluid to a supplemental or charging circuit and including a supplemental feed line downstream of the primary and auxiliary valves to provide fluid flow to the supplemental or charging circuit.

18. A power machine comprising:
a body;
at least one lift arm rotationally coupled to the body;
at least one cylinder coupled to the body and the lift arm;
a first circuit coupled to a fluid line to supply fluid to the at least one cylinder through a first valve;
a second circuit including at least one second valve in series with the first valve of the first circuit downstream of the first circuit;
a supplemental line connected to the fluid line in parallel with the second circuit or valve and further including a pilot valve activated based upon flow pressure upstream of the second valve and operable to provide fluid flow from the supplemental line to a drain line or tank.

19. A method comprising the steps of:
supplying fluid to at least one auxiliary valve in series with a primary valve;
providing fluid flow from a fluid line to a supplemental line coupled to the fluid line upstream of the at least one auxiliary valve and downstream of the primary valve to supply fluid to a supplemental circuit in parallel with the at least one auxiliary valve; and
providing fluid flow from the fluid line downstream of the at least one auxiliary valve to the supplemental line or supplement circuit in parallel with fluid flow to a drain line or tank.

20. The method of claim 19 and further comprising the step of:
utilizing fluid pressure upstream of the at least one auxiliary valve to operate a pilot valve to provide fluid flow from the supplemental line to the drain line or tank.

* * * * *